(12) United States Patent
Williams et al.

(10) Patent No.: US 7,575,315 B2
(45) Date of Patent: Aug. 18, 2009

(54) MULTIPLE PRINT UNIT CONFIGURATIONS

(75) Inventors: Kenneth R. Williams, Vancouver, WA (US); Steve O. Rasmussen, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1753 days.

(21) Appl. No.: 10/015,911

(22) Filed: Oct. 30, 2001

(65) Prior Publication Data

US 2003/0081227 A1    May 1, 2003

(51) Int. Cl.
*B41J 2/01*    (2006.01)
(52) U.S. Cl. .................................. 347/102; 347/101
(58) Field of Classification Search ......... 347/101–103, 347/88, 99, 100
See application file for complete search history.

(56) References Cited

U.S. PATENT DOCUMENTS 5,428,375 A  *  6/1995 Simon et al. .................. 347/12
5,570,118 A  * 10/1996 Rezanka et al. ............... 347/43
5,764,263 A  *  6/1998 Lin .............................. 347/101
6,076,917 A  *  6/2000 Wen ............................. 347/43
6,155,669 A  * 12/2000 Donahue et al. .............. 347/42
6,585,350 B2 *  7/2003 Barinaga ....................... 347/33
6,672,705 B2 *  1/2004 Kitahara et al. ............... 347/42

FOREIGN PATENT DOCUMENTS

JP             02212146 A  *  8/1990

* cited by examiner

*Primary Examiner*—Manish S Shah (57) ABSTRACT

A printing system includes multiple print units which each have one or more printbar assemblies to transfer an imaging medium onto a print media. An individual print unit can include a heater system to dry the imaging medium transferred onto the print media by the one or more printbar assemblies of the individual print unit. For a printing system with two print units, a first percentage of the imaging medium is transferred onto the print media, the print media is advanced beyond the one or more printbar assemblies of the first print unit, and a first heater system dries the first percentage of the imaging medium. A second percentage of the imaging medium is then transferred onto the print media, the print media is advanced beyond the one or more printbar assemblies of the second print unit, and a second heater system dries the second percentage of the imaging medium.

35 Claims, 7 Drawing Sheets

MULTIPLE PRINT UNIT CONFIGURATIONS

TECHNICAL FIELD

This invention relates to printing mechanisms and, in particular, to configurations of multiple print units having one or more printbar assemblies and/or heater systems.

BACKGROUND

An inkjet printer includes a printing assembly having a printhead, or printheads, to deposit ink onto a print media, such as paper. A printhead has an orifice plate that is formed with nozzles through which ink drops are "fired", or otherwise ejected, onto the print media to form an image, such as text or a picture. The ink drops dry, or are heated to dry, on the print media shortly after deposition to form the printed image.

There are various types of inkjet printheads including, for example, thermal inkjet printheads and piezoelectric inkjet printheads. For a thermal inkjet printhead, ink droplets are ejected from individual nozzles by localized heating with a heating element located at individual nozzles. An electric current is applied to a heating element which causes a small volume of ink to be rapidly heated and vaporized. The ink expands when heated which causes it to be ejected through the nozzle. A driver circuit is coupled to individual heating elements to provide the energy pulses and thereby controllably deposit ink drops from associated individual nozzles. The drivers are responsive to character generators and other image forming circuitry to energize selected nozzles of a printhead for forming images on the print media.

A conventional inkjet printer has a print unit that includes a reciprocating inkjet pen carriage system for travel back and forth across a print zone along an axis that spans a print media, or otherwise spans a printing width. A reciprocating inkjet pen can be passed over the same section of an image in a print area to provide redundant printing and improve printed image quality. With the advent of fixed page wide array printbar assemblies having multiple printheads that span the width of a print media, or otherwise span a printing width, there is a need for print unit configurations that provide a similar printing redundancy to improve printed image quality.

Paper cockle can occur when print media becomes wet from the ink being deposited onto the media, causing the print media to expand and become wavy having an uneven appearance, particularly when different areas of the media expand at different rates and in different amounts. Typically, ink applied by a thermal inkjet to form an image on a print media is 70-80% water which is the medium used to boil the fluid and disperse the ink. Drying the ink with a heater after it has been deposited onto the print media removes, or otherwise dissipates, the water from the ink before it soaks into the fibers and expands the print media.

Another factor that adds to paper cockle in some printers is the application of chemical compounds known as "fixers." Fixers are colorless transparent compounds that are applied to the print media either before or after the ink is deposited to help prevent smearing of an image, sharpen images such as edges of letters, enhance colors, and the like. Water is the vehicle by which fixers are applied by a thermal inkjet to a print media which adds to the excess of moisture. However, fixers not only add more moisture to a print media, but when a fixer is applied, more ink can be required to produce an acceptable optical density of the colors which adds even more moisture to some areas of the print media. This causes a greater likelihood of paper cockle.

With page wide array printbar assemblies, a greater quantity of ink can be deposited onto a print media at a faster rate than with a conventional inkjet printer having a reciprocating inkjet pen carriage system. When a greater quantity of ink is deposited in less time, the print media is more susceptible to paper cockle, and more powerful heaters are required to dry the ink. Additionally, more heat for a drier media can be required for post processing the print media, such as with page trimmers, folders, booklet makers, laminators, and the like. More heat from more heaters, however, can degrade the quality of the printheads and nozzles through which the ink is deposited onto the print media. Accordingly, print unit configurations are needed to dissipate greater quantities of moisture from ink that is applied at a faster rate while maintaining the integrity of the printheads and nozzles that deposit the ink.

SUMMARY

A printing system includes multiple print units which each have one or more printbar assemblies to transfer an imaging medium onto a print media. For a printing system having two print units, for example, a first percentage of the imaging medium is transferred onto the print media with the printbar assemblies of a first print unit and a second percentage of the imaging medium is then transferred onto the print media with the printbar assemblies of a second print unit. Each print unit of the printing system can transfer one-half of the imaging medium onto the print media, for example. Alternatively, the first and second print units can transfer any combination of percentages of imaging medium onto the print media. For a printing system having more than two print units, the percentage of the imaging medium transferred onto the print media by any one print unit can correspond to the number of print units in the particular printing system. Alternatively, the print units can transfer any combination of percentages of imaging medium onto the print media to collectively form a printed image.

An individual print unit can include a heater system to remove moisture from the print media and from the imaging medium transferred onto the print media by the one or more printbar assemblies of an individual print unit. For the printing system having two print units, the first percentage of the imaging medium is transferred onto the print media with the first print unit, the print media is advanced beyond the one or more printbar assemblies of the first print unit, and a first heater system dries the first percentage of the imaging medium. The second percentage of the imaging medium is then transferred onto the print media with the second print unit, the print media is advanced beyond the one or more printbar assemblies of the second print unit, and a second heater system dries the second percentage of the imaging medium.

BRIEF DESCRIPTION OF THE DRAWINGS

The same numbers are used throughout the drawings to reference like features and components.

DETAILED DESCRIPTION

Introduction

The following describes systems and methods for a printing system having multiple print units that each include one or more printbar assemblies. A printbar assembly, also referred to as a page wide array printbar, has printheads that overlap for continuous printing across the width of a print media, and is capable of printing more pages at a faster rate than conventional scanning, or reciprocating, type pen carriage systems that travel back and forth across a print zone to print. A print unit can include a heater system to dry an imaging medium, such as ink, that is transferred onto a print media with the printbar assemblies of the print unit. The printing system described herein can be implemented in many different printing devices, to include inkjet printing devices.

Exemplary Printer Architecture

Figure 1:
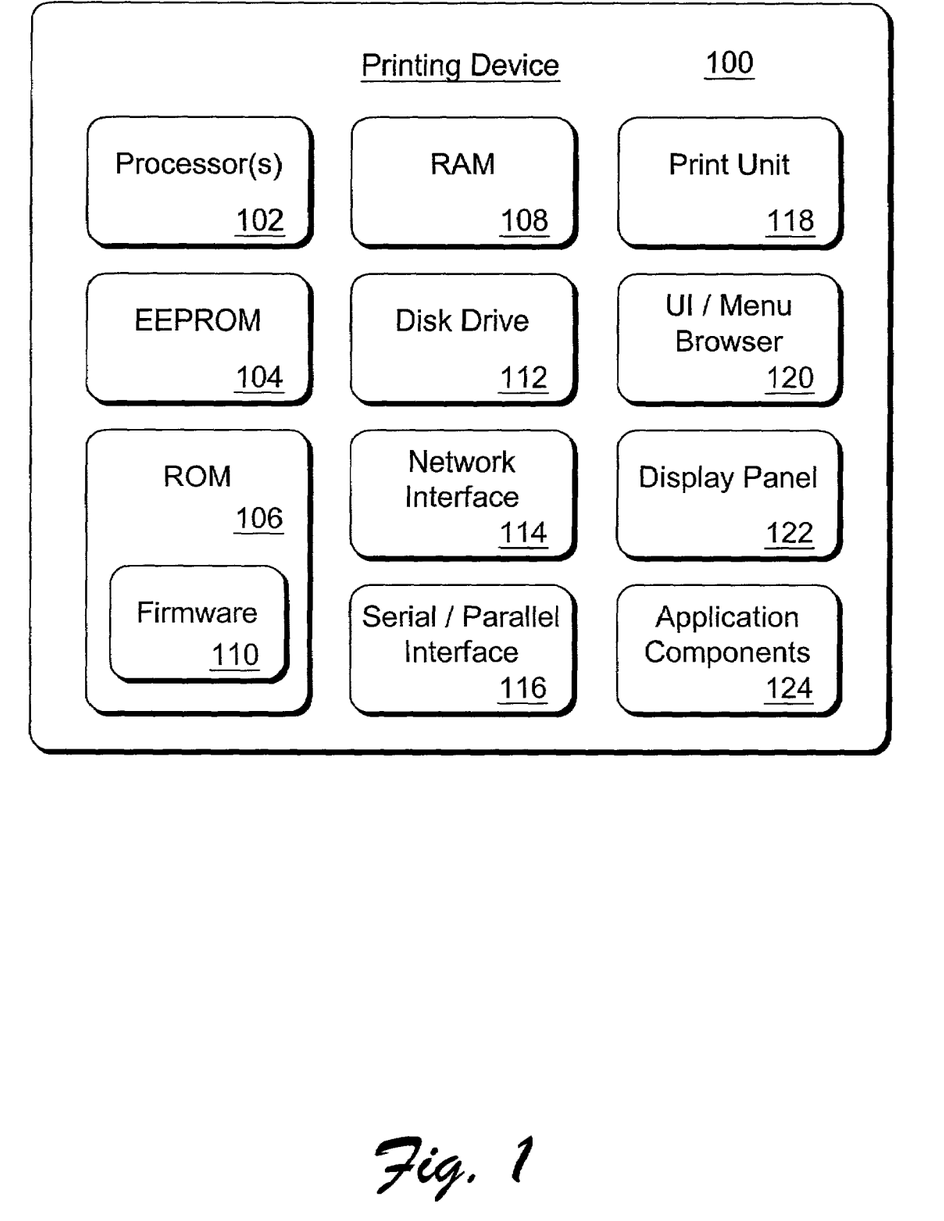
FIG. 1 is block diagram that illustrates various components of an exemplary printing device.

FIG. 1 illustrates various components of an exemplary printing device 100 that can be utilized to implement the inventive techniques described herein. Printer 100 includes one or more processors 102, an electrically erasable programmable read-only memory (EEPROM) 104, ROM 106 (non-erasable), and a random access memory (RAM) 108. Although printer 100 is illustrated having an EEPROM 104 and ROM 106, a particular printer may only include one of the memory components. Additionally, although not shown, a system bus typically connects the various components within printing device 100.

Printer 100 includes a firmware component 110 that is implemented as a permanent memory module stored on ROM 106, or on other components in printing device 100. For example, firmware can be implemented as a component of processor 102, or as a component of a heater controller or print media line feed controller (controllers not shown). Firmware 110 is programmed and tested like software, and is distributed with printer 100. Firmware 110 can be implemented to coordinate operations of the hardware within printer 100 and contains programming constructs used to perform such operations.

Processor(s) 102 process various instructions to control the operation of the printer 100 and to communicate with other electronic and computing devices. The memory components, EEPROM 104, ROM 106, and RAM 108, store various information and/or data such as configuration information, fonts, templates, data being printed, and menu structure information. Although not shown, a particular printer can also include a flash memory device in place of or in addition to EEPROM 104 and ROM 106.

Printer 100 also includes a disk drive 112, a network interface 114, and a serial/parallel interface 116. Disk drive 112 provides additional storage for data being printed or other information maintained by printer 100. Although printer 100 is illustrated having both RAM 108 and a disk drive 112, a particular printer may include either RAM 108 or disk drive 112, depending on the storage needs of the printer. For example, an inexpensive printer may include a small amount of RAM 108 and no disk drive 112, thereby reducing the manufacturing cost of the printer.

Network interface 114 provides a connection between printer 100 and a data communication network. Network interface 114 allows devices coupled to a common data communication network to send print jobs, menu data, and other information to printer 100 via the network. Similarly, serial/parallel interface 116 provides a data communication path directly between printer 100 and another electronic or computing device. Although printer 100 is illustrated having a network interface 114 and serial/parallel interface 116, a particular printer may only include one interface component.

Printer 100 also includes a print unit 118 that includes mechanisms arranged to selectively apply an imaging medium such as liquid ink, toner, and the like to a print media in accordance with print data corresponding to a print job. Print media can include any form of media used for printing such as paper, plastic, fabric, Mylar, transparencies, and the like, and different sizes and types such as 8½×11, A4, roll feed media, etc. For example, print unit 118 can include an inkjet printing mechanism that selectively causes ink to be applied to a print media in a controlled fashion. The ink on the print media can then be more permanently fixed to the print media, for example, by selectively applying conductive, convective, microwave, and/or radiant thermal energy to the ink. Those skilled in the art will recognize that there are many different types of print units available, and that for the purposes of the present invention, print unit 118 can include any of these different types. Additionally, those skilled in the art will recognize that there are many different types of heat generating devices that can be implemented in any number of combinations to apply the thermal energy.

Printer 100 also includes a user interface and menu browser 120, and a display panel 122. The user interface and menu browser 120 allows a user of the printer 100 to navigate the printer's menu structure. User interface 120 can be indicators or a series of buttons, switches, or other selectable controls that are manipulated by a user of the printer. Display panel 122 is a graphical display that provides information regarding the status of printer 100 and the current options available to a user through the menu structure.

Printer 100 can, and typically does include application components 124 that provide a runtime environment in which software applications or applets can run or execute. Those skilled in the art will recognize that there are many different types of runtime environments available. A runtime environment facilitates the extensibility of printer 100 by allowing various interfaces to be defined that, in turn, allow the application components 124 to interact with the printer.

General reference is made herein to one or more printing devices, such as printing device 100. As used herein, "printing device" means any electronic device having data communications, data storage capabilities, and/or functions to render printed characters and images on a print media. A printing device may be a printer, fax machine, copier, plotter, and the like. The term "printer" includes any type of printing device using a transferred imaging medium, such as ejected ink, to create an image on a print media. Examples of such a printer can include, but are not limited to, inkjet printers, plotters, portable printing devices, as well as multi-function combination devices. Although specific examples may refer to one or more of these printers, such examples are not meant to limit the scope of the claims or the description, but are meant to provide a specific understanding of the described implementations.

Exemplary Printing Device

Figure 2:
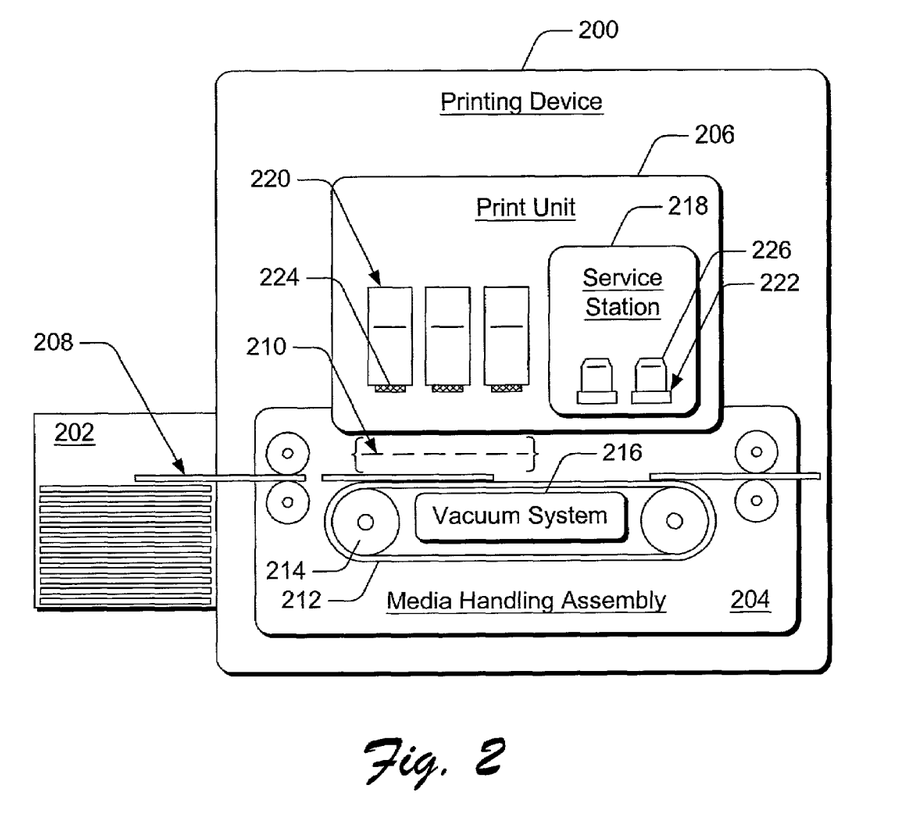
FIG. 2 is an illustration of various components of an exemplary printing device.

FIG. 2 illustrates a printing device 200 that can include one or more of the components of exemplary printing device 100 (FIG. 1). The various exemplary printing device configurations are described in the environment and context of an inkjet printing device. While it is apparent that printing device components vary from one device to the next, those skilled in the art will recognize the applicability of the present invention to printing devices in general.

Printing device 200 includes a print media container 202, a media handling assembly 204, and a print unit 206. The print media container 202 holds print media 208, such as paper, until the media handling assembly 204 takes up a print media and routes it through printing device 200 for printing. The physical path of the print media through a printer is typically referred to as the "print path" or "print media path". When print media 208 is routed within printing device 200 by media handling assembly 204, the print media passes through a print region 210 in the printing device. Within print region 210, an imaging medium, such as ink, is transferred from the print unit 206 onto print media 208 in response to the printing device 200 receiving print data corresponding to a print job.

Media handling assembly 204 includes components to route print media 208 through printing device 200. The media handling assembly components include a media routing belt 212 that is positioned to route print media 208 through print region 210. The media routing belt 212 can be formed of a metal material, or other material that withstands the structural demands imposed by the printing process, to include localized heat that is generated to dry an imaging medium, such as ink, that has been deposited onto a print media.

Media routing belt 212 is driven by a belt drive and/or pulley and roller system 214 which is coupled to a motor drive unit (not shown). Those skilled in the art will recognize that there are any number of media handling assembly configurations that can be implemented in any number of printing devices to route print media through a printing device.

Media handling assembly 204 also includes a vacuum system 216 to hold a print media 208 on the media routing belt 212 while the print media 208 is routed through printing device 200. Media routing belt 212 can be perforated, or otherwise facilitate air flow through it, such that vacuum system 216 located underneath the belt can hold the print media 208 on top of the belt while the print media is routed through print region 210.

Figure 3:
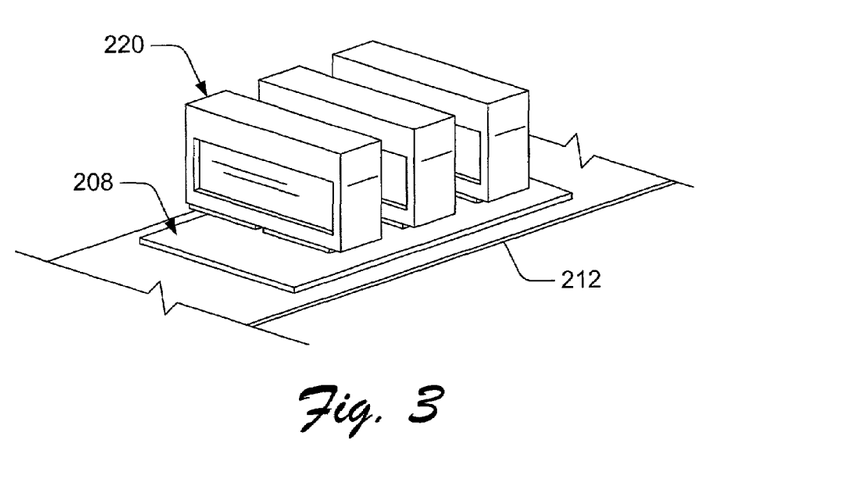
FIG. 3 is an illustration of printbar assemblies positioned for printing on a print media.

Print unit 206 includes a service station 218 and a printbar assembly 220. Print unit 206 can have one or more printbar assemblies 220 to deposit an imaging medium onto a print media 208 within print region 210. Printbar assembly 220 is illustrated from an end-view, and spans the width of a print media 208 as the print media is routed in printing device 200. FIG. 3 illustrates a configuration of more than one printbar assembly 220 positioned for printing over a print media 208 that is routed in printing device 200 via the media routing belt 212.

Service station 218 includes a wiper assembly 222 that is mounted on, coupled to, and/or integrated with service station 218 to clean nozzle sections of printheads 224 on printbar assembly 220. A wiper assembly 222 has wipers 226 to clean printheads 224 and remove ink residue and contaminants to maintain a desired printing quality.

Printheads 224 are cleaned periodically during operation of printing device 200. A processor, or processors, in printing device 200 schedules routine servicing of the printheads based upon the printing time, the number of ink drops being ejected, and/or other printing related factors. For example, the printheads can be cleaned after an approximate time duration, such as after every ten minutes of printing time, or the printheads can be cleaned after a number of print media pages are printed, such as after every one-hundred pages. Service station 218 can have multiple wiper assemblies corresponding to multiple printbar assemblies in print unit 206.

Exemplary Printbar Assembly

Figure 4:
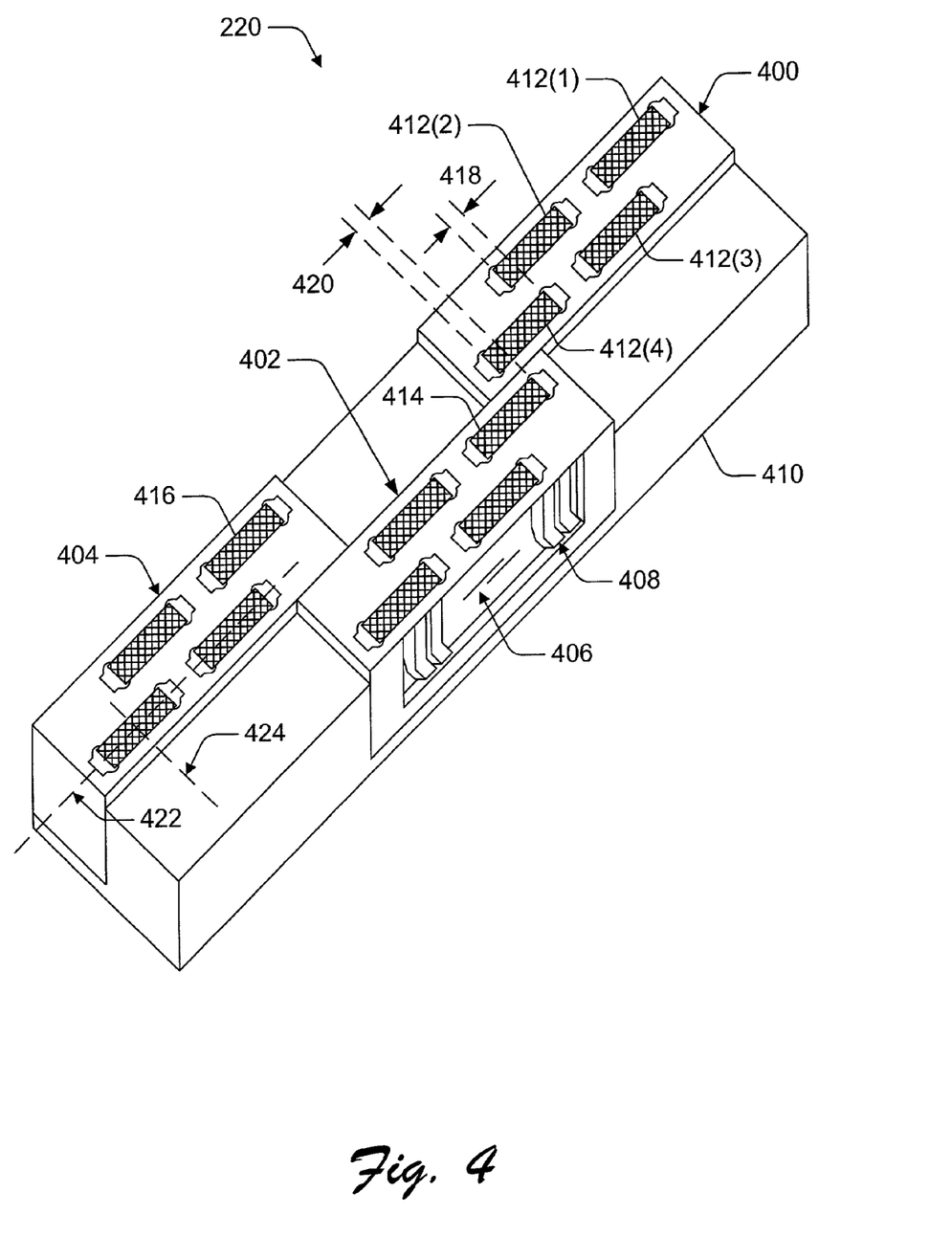
FIG. 4 is an illustration of an exemplary printbar assembly having print modules and multiple printheads.

FIG. 4 illustrates components of an exemplary printbar assembly 220 which is shown having three print modules 400, 402, and 404, although any number of print modules can be combined in a printbar assembly to span the width of a print media, a print region, or span a printing width. A print module is also commonly referred to as a "cartridge", or a "pen". Conventionally, a print module includes an ink reservoir 406 to store a supply of ink and electrical connectors 408 to receive printing control signals from one or more printing device processors.

Printbar assembly 220 has a framework 410 to support and align the print modules, and to install the printbar assembly in a printing device. Those skilled in the art will recognize that any number of varying framework configurations can be implemented to support the print modules, and the printbar assembly in a printing device.

A print module, such as print module 400, has any number of printheads 412, each having multiple nozzles that eject ink onto a print media to form an image. A printhead is also commonly referred to as a "die". Print module 402 has multiple printheads such as printhead 414, and print module 404 has multiple printheads such as printhead 416. Each printhead has a longitudinal axis 422 and a transverse axis 424.

Collectively, the printheads on print bar assembly 220 span a printing width, a print region, or a print media width, and overlap to effectively deposit or transfer an imaging medium across the printing width without gaps in the imaging medium. The printheads on an individual print module overlap, and the printheads on adjacent print modules overlap. For example printheads 412(2) and 412(4) on print module 400 have an overlap 418, and printhead 412(4) on print module 400 has an overlap 420 with printhead 414 on print module 402.

Exemplary Print Unit Configurations

Figure 5:
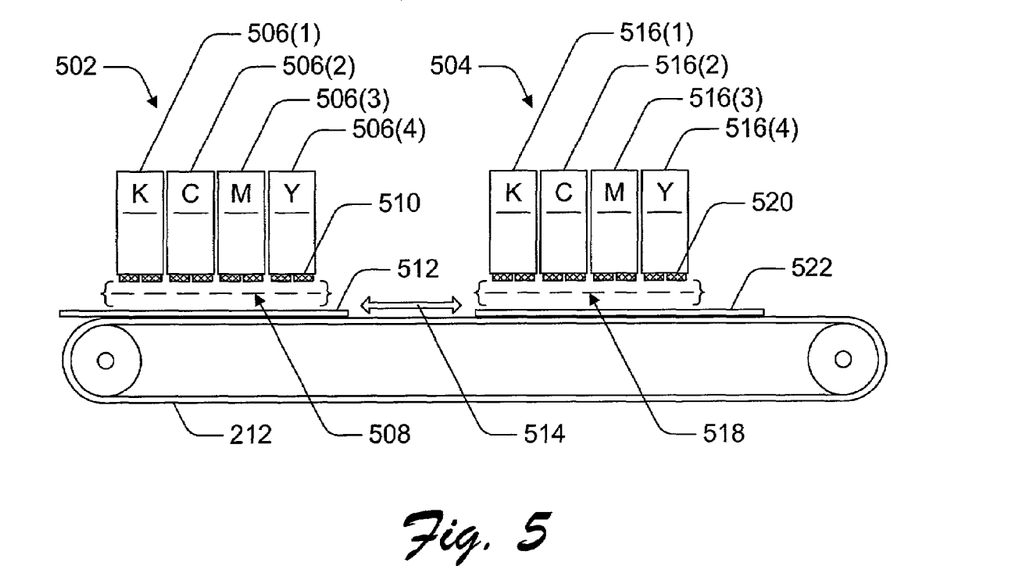
FIG. 5 is an illustration of an exemplary printing system having multiple print units that each include printbar assemblies.

FIG. 5 illustrates an exemplary printing system 500 having a recurring configuration of multiple print units 502 and 504. Print unit 502 has printbar assemblies 506(1-4), each having a different colored imaging medium, such as liquid ink. For example, printbar assembly 506(1) prints black, which is commonly indicated with a "K", printbar assembly 506(2) prints cyan, "C", printbar assembly 506(3) prints magenta, "M", and printbar assembly 506(4) prints yellow, "Y".

Printbar assemblies 506(1-4) of print unit 502 are shown in a print position within, or over, a print region 508. The printbar assemblies 506(1-4), such as printbar assembly 506(4), each have multiple printheads 510 that collectively span a width of a print media 512, or otherwise span a printing width or print region. Print media 512 is routed in a printing device via the media routing belt 212 (FIG. 2). An arrow 514 identifies a horizontal plane of print media 512 as it is routed in the printing device for printing.

Print unit 504 has printbar assemblies 516(1-4), each also having a different colored imaging medium, such as liquid ink. Each printbar assembly 516(1-4) has the same color as a corresponding printbar assembly 506(1-4). For example, printbar assembly 516(1) prints black, printbar assembly 516(2) prints cyan, printbar assembly 516(3) prints magenta, and printbar assembly 516(4) prints yellow.

Printbar assemblies 516(1-4) of print unit 504 are shown in a print position within, or over, a print region 518. The printbar assemblies 516(1-4), such as printbar assembly 516(4), each have multiple printheads 520 that collectively span a width of a print media 522, or otherwise span a printing width or print region. Print media 522 is also routed in the printing device via the media routing belt 212 (FIG. 2).

When print media 512 is routed for printing in a printing device, the first set of printbar assemblies 506(1-4) transfer a percentage of an imaging medium onto print media 512 to form a printed image. The percentage of the imaging medium transferred by the printbar assemblies 506(1-4) of print unit 502 corresponds to the number of print units for a particular printing system.

Printing system 500 has two print units 502 and 504. Thus, printbar assemblies 506(1-4) of print unit 502 transfer a first percentage of the imaging medium onto print media 512 to form the printed image. Accordingly, printbar assemblies 516(1-4) of print unit 504 transfer a complimentary second percentage of the imaging medium to form the remainder of the printed image. For example, if an image is to be printed black and magenta with printing system 500, fifty-percent (50%) of the black color for the image can be printed with printbar assembly 506(1) and fifty-percent (50%) of the magenta color for the image can be printed with printbar assembly 506(3). After the print media is advanced, the remaining fifty-percent (50%) of the black color for the image is printed with printbar assembly 516(1) and the remaining fifty-percent (50%) of the magenta color for the image is printed with printbar assembly 516(3).

Although printing system 500 is shown with only two print units, those skilled in the art will recognize that any number of print units, having any number of printbar assemblies, can be utilized, or implemented as an array, to transfer an imaging medium onto a print media. For example, a printing system can have eight (8) print units each having printbar assemblies of the colors described. When printing, the printbar assemblies in each of the eight (8) print units can transfer one-eighth (⅛) of the imaging medium onto a print media, for example. However, each of the eight (8) print units can be implemented to transfer any percentage amount of the imaging medium onto the print media, where the percentage amounts transferred equals one-hundred percent (100%) of the transferred imaging medium. Typically, it is preferable to print photographs over eight (8) times, and having a printing system with eight (8) print units can accommodate and provide preferable image quality results for photograph printing.

The redundant sets of printbar assemblies is analogous to multi-pass printing with a printer having a print unit that includes a reciprocating inkjet pen carriage system for travel back and forth across a print zone. The multiple sets of print units compensate for printing deficiencies that can cause image defects. For example, a defective or otherwise inoperable nozzle in printhead 510 of printbar assembly 506(4) may not transfer a desired quantity of yellow ink onto a print media during a print job. However, redundant printbar assembly 516(4), which is also designated to transfer yellow ink onto the print media can compensate for the deficiency of printhead 510.

Those skilled in the art will also recognize that the printbar assembly color designations can be implemented as any number of combinations for both the printbar assemblies and the print units. For example, printbar assemblies 506(1-4) of print unit 502 can be implemented as a combination of "Fixer-K-C-c" where the upper-case letters "K" and "C" designate a full density imaging medium and the lower-case letter "c" designates a low density imaging medium. Printbar assemblies 516(1-4) of print unit 504 can be implemented as a combination of "M-m-Y-Fixer". Between the two print units 502 and 504, each of the colors black (K), cyan (C), magenta (M), and yellow (Y) are available for print use, as well as low density cyan (c) and low density magenta (m). Low density imaging mediums are lighter variations of the same color (i.e., absorbs the same frequency of light) and have photographic applications, for example, such as using a low density cyan to print a sky tone image, or low density magenta to print a skin tone image.

Figure 6:
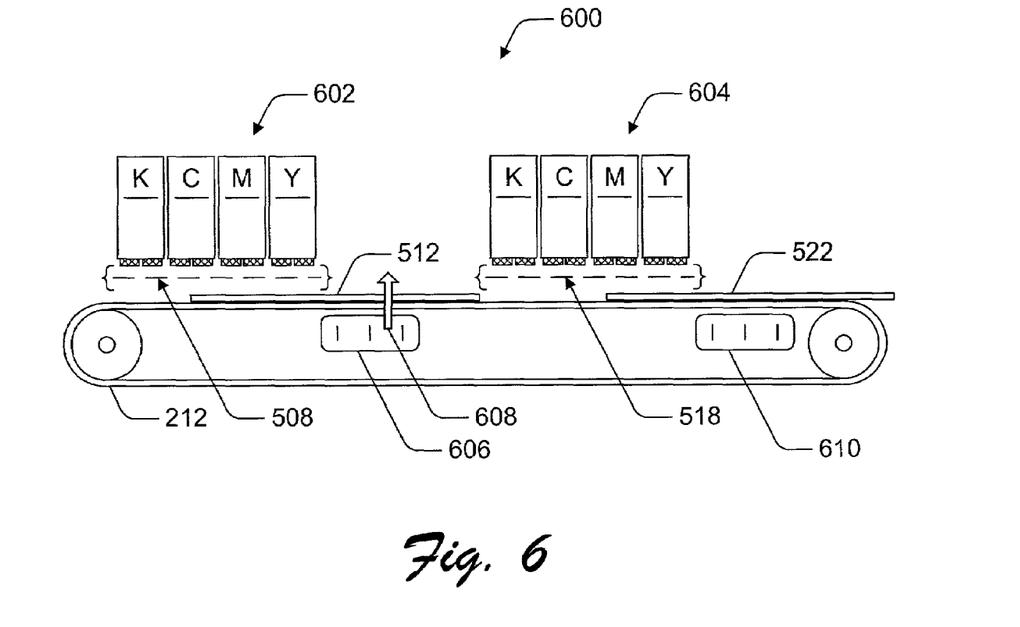
FIG. 6 is an illustration of an exemplary printing system having multiple print units that each include printbar assemblies and corresponding heater systems.

FIG. 6 illustrates a printing system 600 having multiple print units 602 and 604. Print unit 602 is the same as print unit 502 (FIG. 5) with the addition of a heater system 606 that is positioned below media routing belt 212, which is effectively under print media 512. Heater system 606 generates heat 608 to dry the imaging medium transferred onto print media 512 with printbar assemblies 506(1-4). Although heater system 606 is positioned under print media 512, the heater system is not positioned under print region 508 to prevent damaging printheads 510 of the printbar assemblies with the heat 608.

Similarly, print unit 604 is the same as print unit 504 (FIG. 5) with the addition of a heater system 610 that is positioned below media routing belt 212. Heater system 610 generates heat to dry the imaging medium transferred onto print media 522 with printbar assemblies 516(1-4). Those skilled in the art will recognize that heater systems 606 and 610 can be implemented with any number, types, and combinations of heaters, such as ceramic conductive strip heaters, and/or convective, microwave, or radiant heaters.

Figure 7:
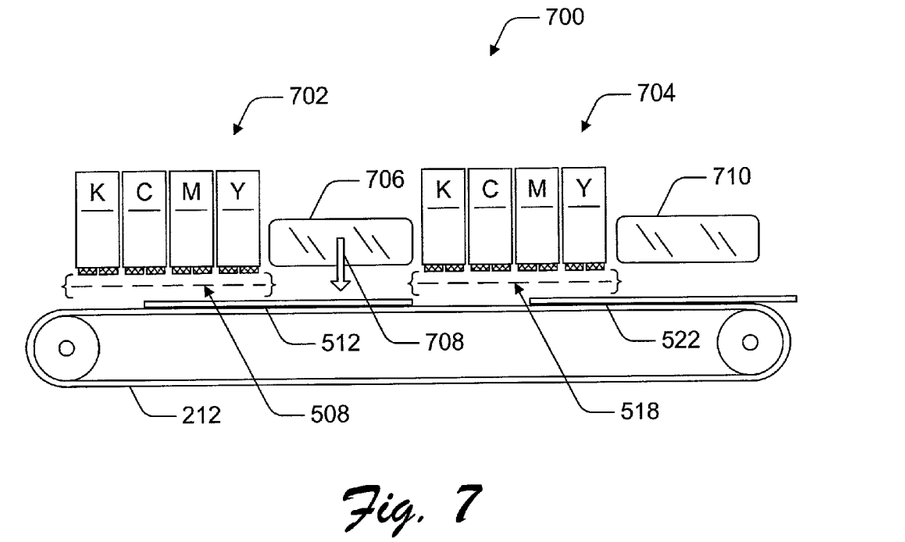
FIG. 7 is an illustration of an exemplary printing system having multiple print units that each include printbar assemblies and corresponding heater systems.

FIG. 7 illustrates a printing system 700 having multiple print units 702 and 704. Print unit 702 is the same as print unit 502 (FIG. 5) with the addition of a heater system 706 that is positioned above media routing belt 212, which is also effectively over print media 512. Heater system 706 generates heat 708 to dry the imaging medium transferred onto print media 512 with printbar assemblies 506(1-4). Heater system 706 is positioned so as to prevent damaging printheads 510 of the printbar assemblies with the heat 708.

Similarly, print unit 704 is the same as print unit 504 (FIG. 5) with the addition of a heater system 710 that is positioned above media routing belt 212. Heater system 710 generates heat to dry the imaging medium transferred onto print media 522 with printbar assemblies 516(1-4). Those skilled in the art will recognize that heater systems 706 and 710 can implemented with any number, types, and combinations of heaters, such as convective, microwave, or radiant heaters, for example.

Figure 8:
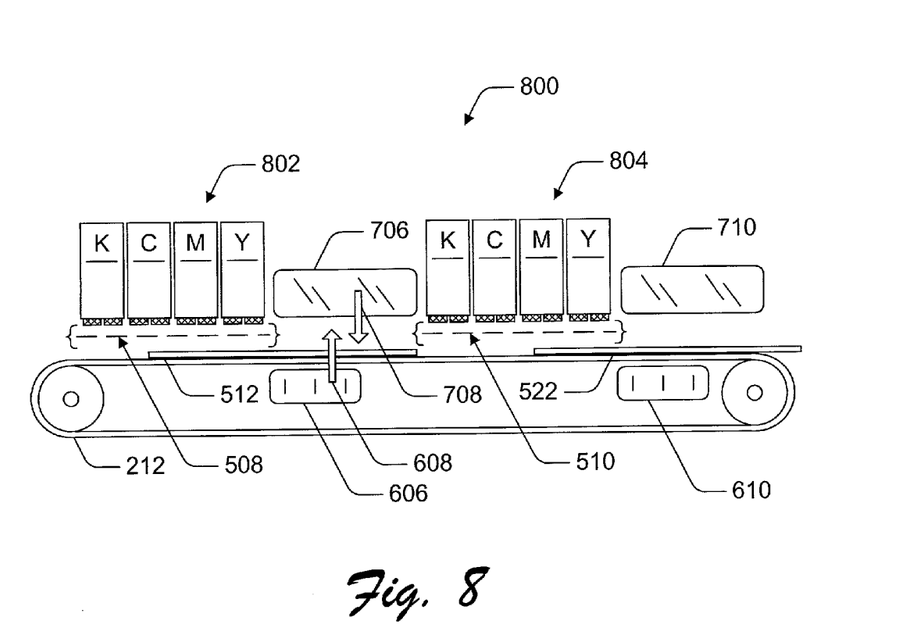
FIG. 8 is an illustration of an exemplary printing system having multiple print units that each include printbar assemblies and corresponding heater systems.

FIG. 8 illustrates a printing system 800 having multiple print units 802 and 804. Print unit 802 includes the printbar assemblies 506(1-4) of print unit 502 (FIG. 5) and heater systems 606 (FIG. 6) and 706 (FIG. 7). Heater system 606 generates heat 608 to dry the imaging medium from below print media 512 and heater system 706 generates heat 708 to dry the imaging medium from above print media 512. Although printing systems 600, 700, and 800 are shown with only two print units, those skilled in the art will recognize that any number of print units, having any number of printbar assemblies and heater systems, can be utilized, or implemented as an array, to transfer an imaging medium onto a print media.

Figure 9:
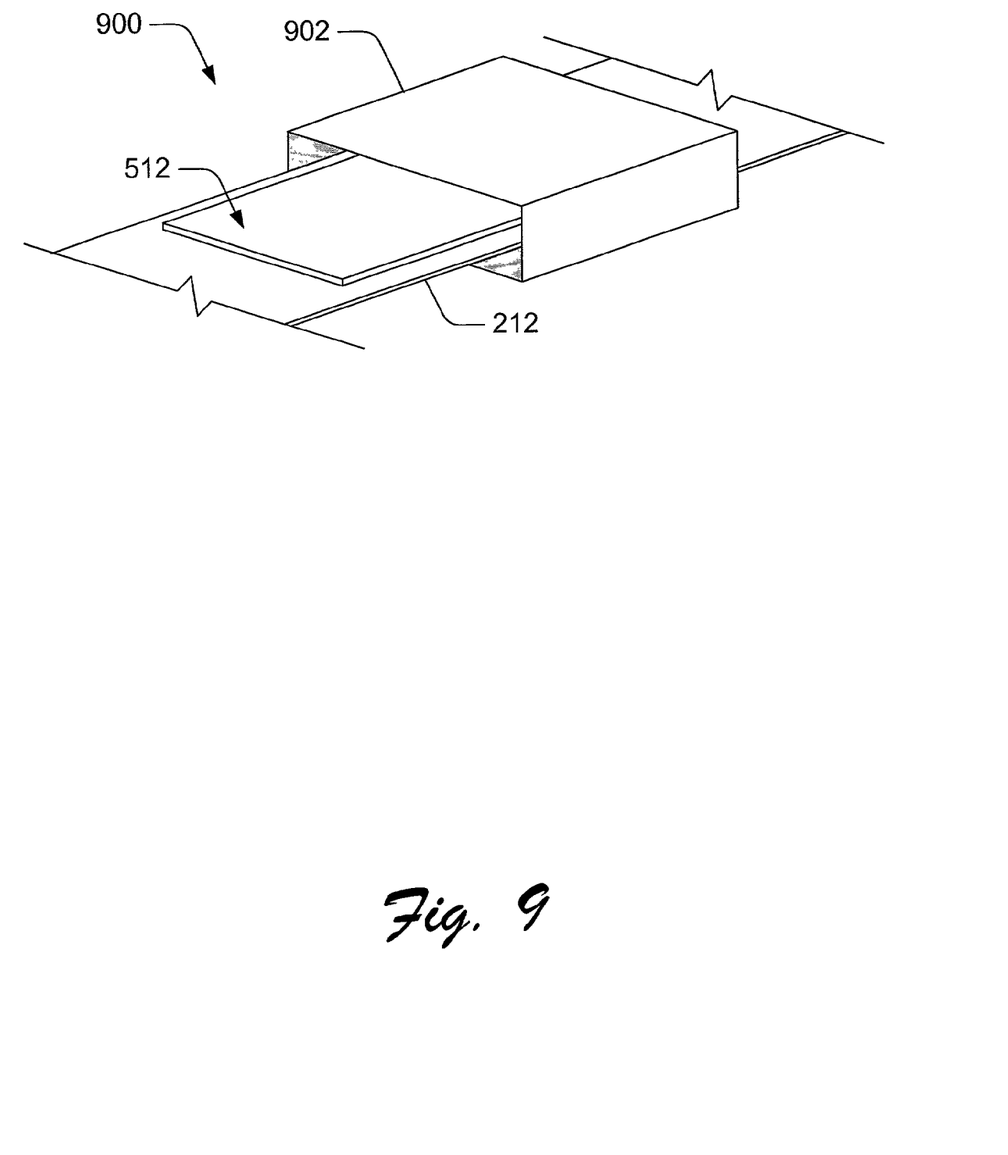
FIG. 9 is an illustration of an exemplary heater system that envelops a portion of a print media.

FIG. 9 further illustrates a heater system 900 that can be implemented as a component of print units 802 and 804 (FIG. 8), for example. A heater 902, such as a microwave heater, can be implemented to dry the imaging medium both from below print media 512 and from above the print media as it is routed in a printing device through heater 902 via media routing belt 212. The heater 902 envelops a portion of print media 512 to dry the imaging medium transferred onto the print media. Those skilled in the art will recognize that components of heater 902, such as the heating elements or coils, can be positioned within a proximity of the print media 512. Alternatively, the components of heater 902 can be positioned elsewhere within the printing device and the generated heat can be transferred to within a proximity of the print media via a heating duct, for example.

An array of any number of print units that include heater systems and redundant printbar assemblies both compensates for printing deficiencies and balances an imaging medium deposition rate versus a heat application rate to dry the imaging medium and prevent paper cockle. It should be appreciated that implementing a printing system with multiple print units decreases the amount of ink that is deposited onto the print media at any one time and the amount of ink that needs to be dried with the heaters before a subsequent percentage of ink is deposited onto the print media. Multiple print units implemented to deposit ink onto the print media in stages also decreases the likelihood of other printing defects, such as coalescence where too many ink drops can merge or bleed together.

Those skilled in the art may also recognize that a heat mass transfer system, such as fan units, (not shown) can also be implemented within a printing device to exhaust heat and imaging medium vapors generated from the heater systems from an interior of the printing device to an exterior of the printing device. Primarily, a heat mass transfer system is implemented to reduce the humidity boundary around and over the print media that is created when applying heat to dry the print media and/or the imaging medium. Furthermore, it should be appreciated that drying the print media, or otherwise applying heat to reduce the humidity boundary, is intended to remove enough of the moisture from the print media and/or imaging medium to avoid such printing problems as paper cockle and coalescence. Drying the print media does not necessarily entail removing all of the moisture content from the print media. Neither does drying the print media necessarily imply restoring the original moisture content of the print media before the imaging medium was transferred onto the print media.

Methods for Exemplary Print Unit Configurations

Figure 10:
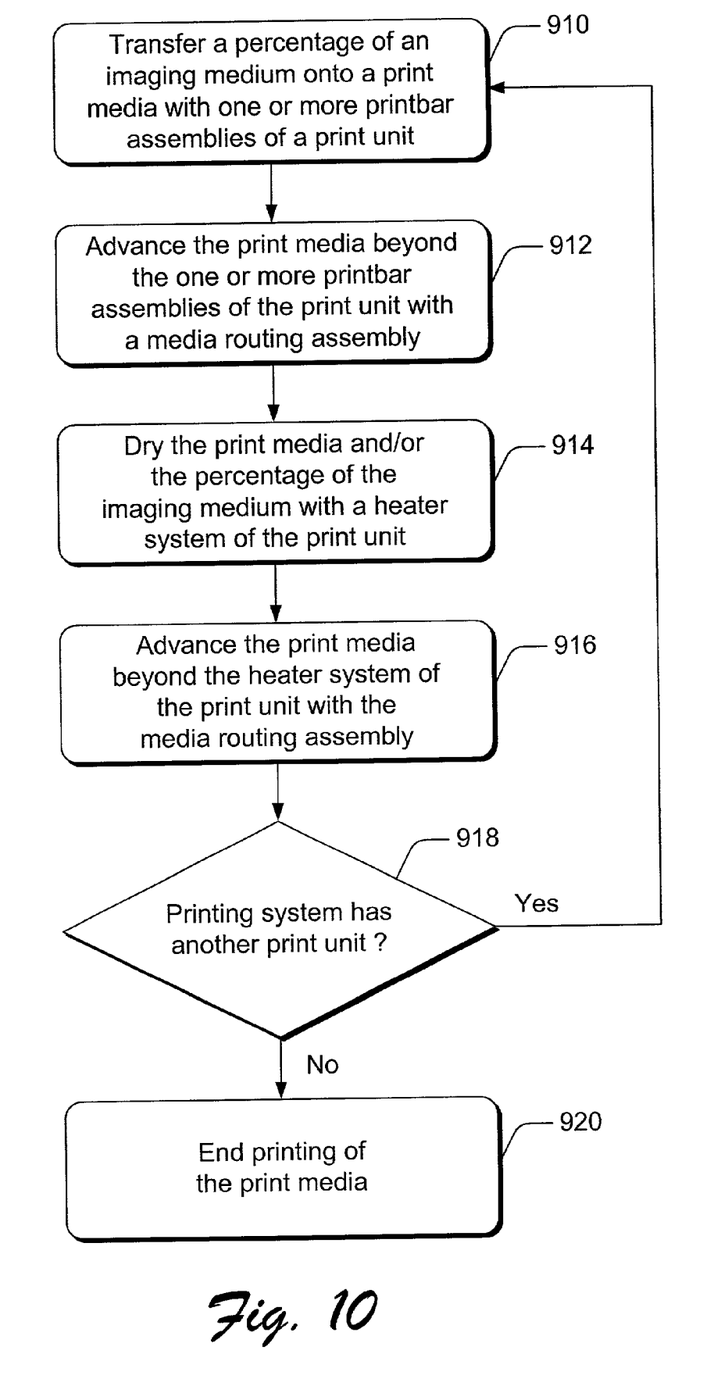
FIG. 10 is a flow diagram that describes a method for printing with exemplary print unit configurations.

FIG. 10 illustrates a method for printing with the exemplary print unit configurations described herein. The order in which the method is described is not intended to be construed as a limitation. Furthermore, the method can be implemented in any suitable hardware, software, firmware, or combination thereof. In addition, the method can be implemented by one or more processors executing instructions that are maintained on a computer-readable media.

At block 910, a percentage of an imaging medium, such as ink, is transferred onto a print media to form a portion of a printed image with one or more printbar assemblies of a print unit in a printing system. At block 912, the print media is advanced beyond the one or more printbar assemblies of the print unit with a media routing assembly.

At block 914, the print media and/or the percentage of the imaging medium is dried with a heater system of the print unit. The heater system can include a heater, or heaters, positioned below the print media, a heater, or heaters, positioned above the print media, and/or heater components positioned to envelop a portion of the print media. At block 916, the print media is advanced beyond the heater system of the print unit with the media routing assembly.

At block 918, it is determined whether the printing system has another or subsequent print unit. If the printing system does have another print unit (i.e., "yes" from block 918), the method returns to block 910 where a next percentage of the imaging medium is transferred onto the print media to continue forming the printed image with one or more printbar assemblies of a subsequent print unit. Thus, multiple percentages of the imaging medium are transferred onto the print media to form corresponding multiple portions of the printed image with the one or more printbar assemblies of multiple print units. The multiple percentages of the imaging medium collectively form the printed image.

If the printing system does not have another print unit (i.e., "no" from block 918), printing of the particular print media is ended at block 920. It should be appreciated that if a particular print job defines printing more than one print media page, the method starts over at block 910 for any subsequent pages. Additionally, it should be appreciated that the method for printing described with respect to FIG. 10 can be implemented for multiple print media at any one time as part of a continuous printing process. For example, imaging medium on a first print media can be dried at 914 while imaging medium is transferred onto a second print media at 910.

CONCLUSION

Multiple sets of print units include any number and configurations of heater systems and redundant printbar assemblies that both compensate for printing deficiencies that can cause image defects and dries an imaging medium deposited onto a print media to prevent paper cockle, coalescence, and other possible printing defects. The print unit heaters dry the imaging medium while maintaining the integrity of the printheads and nozzles of the printbar assemblies that deposit the ink.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A printing system, comprising:
   a first set of print bar assemblies configured to transfer a first percentage of an imaging medium onto a first side of a print media, wherein the first set of print bar assemblies, when stationary, are configured to collectively span a width of the print media;
   a second set of print bar assemblies configured to transfer a second percentage of the imaging medium onto the first side of the print media; and
   the print media being advanced such that the second percentage of the imaging medium is transferred onto the first side of the print media after the first percentage of the imaging medium is transferred onto the first side of the print media; and
   at least one other set of print bar assemblies, each set of print bar assemblies configured to transfer a percentage of the imaging medium corresponding to the number of print bar assembly sets,
   wherein percentages of the imaging medium transferred by print bar assembly sets are substantially the same and are substantially equally distributed amongst the print bar assembly sets.

2. A printing system as recited in claim 1, wherein the first set of print bar assemblies transfers a first half of the imaging medium to form a first portion of a printed image on the print media, and wherein the second set of print bar assemblies transfers a second half of the imaging medium to form a second portion of the printed image.

3. A printing system as recited in claim 1, further comprising a first heater configured to dry the first percentage of the imaging medium and a second heater configured to dry the second percentage of the imaging medium.

4. A printing system as recited in claim 1, further comprising a first heater configured to remove moisture from the first percentage of the imaging medium and a second heater configured to remove moisture from the second percentage of the imaging medium.

5. A printing system as recited in claim 1, further comprising a first heater configured to dry the first percentage of the imaging medium and a second heater configured to dry the second percentage of the imaging medium, the first percentage of the imaging medium dried with the first heater before the second percentage of the imaging medium is transferred onto the print media.

6. A printing system as recited in claim 1, further comprising:
    multiple heaters configured to dry the imaging medium, an individual heater corresponding to an individual set of print bar assemblies to dry the percentage of the imaging medium transferred onto the print media by the individual set of print bar assemblies.

7. A printing system as recited in claim 1, further comprising a first heater configured to dry the first percentage of the imaging medium and a second heater configured to dry the second percentage of the imaging medium, the first heater and the second heater positioned under the print media.

8. A printing system. as recited in claim 1, further comprising a first heater system configured to dry the first percentage of the imaging medium and a second heater system configured to dry the second percentage of the imaging medium, the first heater system and the second heater system each including a component positioned to envelop a portion of the print media.

9. The printing system as recited in claim 1, wherein the imaging medium of the first set of print bar assemblies includes a cyan color and wherein the imaging medium of the second set of print bar assemblies includes the cyan color.

10. The printing system as recited in claim 1, wherein the imaging medium of the first set of print bar assemblies includes a magenta color and wherein the imaging medium of the second set of print bar assemblies includes the magenta color.

11. The printing system as recited in claim 1, wherein the imaging medium of the first set of print bar assemblies includes a yellow color and wherein the imaging medium of the second set of print bar assemblies includes the yellow color.

12. The printing system as recited in claim 1, wherein the imaging medium of the first set of print bar assemblies includes cyan, magenta and yellow colors and wherein the imaging medium of the second set of print bar assemblies includes the cyan, magenta and yellow colors.

13. The printing system as recited in claim 1, wherein the imaging medium of the first set includes a black ink and wherein the imaging medium of the second set includes the identical black ink.

14. The printing system as recited in claim 1, wherein the first set of print bar assemblies and the second set of print bar assemblies are configured to transfer same colored chromatic imaging medium to the medium.

15. The printing system as recited in claim 14, wherein the same color chromatic imaging mediums have different densities.

16. The printing system as recited in claim 1, wherein the first set of print bar assemblies includes a first print bar and a second print bar, the second print bar located downstream from the first print bar in a media feed direction.

17. The printing system of claim 1, wherein at least one of the first set of print bar assemblies and the second set of print bar assemblies is configured to transfer fixer to the medium.

18. The printing system as recited in claim 1, wherein the first set of print bar assemblies includes print heads extending along three axes substantially perpendicular to a direction in which the print media is advanced.

19. The printing system as recited in claim 1, wherein the first set of print bar assemblies comprises:
    a plurality of print modules, wherein each of the plurality of print modules includes a plurality of print heads and wherein each print module includes a body connecting the plurality of print heads as a single module; and
    a framework supporting and aligning the plurality of print modules such that the plurality of print modules are connected as a single assembly.

20. The printing system as recited in claim 19, wherein the plurality of print heads overlap in the direction in which the print media is advanced.

21. The printing system as recited in claim 1, wherein the imaging medium transferred by the first set of print bar assemblies is a chromatic color, wherein the imaging medium transferred by the second set of print bar assemblies is the same chromatic color and wherein the first print bar assembly and the second print bar assembly transfer substantially equally distributed substantially same percentages of the imaging medium onto the print media, the percentages corresponding to a number of print bar assemblies sets in the printing system.

22. A method, comprising:
    transferring a first percentage of an imaging medium onto a first side of a print media to form a first portion of a printed image with one or more print bar assemblies of a first print unit;
    transferring a second percentage Of the imaging medium onto the first side of the print media to form a second portion of the printed image with one or more print bar assemblies of a second print unit; and
    advancing the print media such that the second percentage of the imaging medium is transferred onto the print media after the first percentage of the imaging medium has been transferred onto the print media, wherein the percentages of the imaging medium transferred onto the print media with the one or more print bar assemblies of the print units correspond to the number of print units, are substantially the same and are substantially equally distributed amongst the print units.

23. A method as recited in claim 22, further comprising transferring at least one more percentage of the imaging medium onto the print media to form at least one other portion of the printed image with one or more print bar assemblies of at least one other print unit.

24. A method as recited in claim 22, further comprising transferring at least one more percentage of the imaging medium onto the print media to form at least one other portion of the printed image with one or more print bar assemblies of at least one other print unit, a percentage of the imaging medium transferred onto the print media by a print unit corresponding to the number of print units.

25. A method as recited in claim 24, further comprising drying the imaging medium with multiple heaters, an individual heater corresponding to an individual print unit to dry the percentage of the imaging medium transferred onto the print media by the one or more print bar assemblies of the individual print unit.

26. A method as recited in claim 24, further comprising removing moisture from the print media with multiple heaters, an individual heater corresponding to an individual print unit to dry the percentage of the imaging medium transferred onto the print media by the one or more print bar assemblies of the individual print unit.

27. A method as recited in claim 22, further comprising drying the first percentage of the imaging medium with a first heater, and drying the second percentage of the imaging medium with a second heater.

28. A method as recited in claim 22, further comprising removing moisture from the first percentage of the imaging medium with a first heater, and removing moisture from the second percentage of the imaging medium with a second heater.

29. A method as recited in claim 22, further comprising drying the first percentage of the imaging medium with a first heater, and drying the second percentage of the imaging medium with a second heater, the first percentage of the imaging medium dried with the first heater before transferring the second percentage of the imaging medium onto the print media.

30. A method as recited in claim 22, further comprising drying the first percentage of the imaging medium with a first heater, and drying the second percentage of the imaging medium with a second heater, the first heater and the second heater positioned under the print media.

31. A method as recited in claim 22, further comprising drying the first percentage of the imaging medium with a first heater, and drying the second percentage of the imaging medium with a second heater, the first heater and the second heater each positioned to envelop a portion of the print media.

32. A method as recited in claim 22, further comprising drying the first percentage of the imaging medium with a first heater system, and drying the second percentage of the imaging medium with a second heater system, a component of the first heater system and a component of the second heater system each positioned to envelop a portion of the print media.

33. The method of claim 22, wherein a total amount of the imaging medium is transferred onto the first side of the print media using a total number N of print units and wherein each print unit transfers a percentage of the imaging medium substantially equal to 100%/N.

34. A printing system, comprising:
a first set of print bar assemblies configured to transfer a first percentage of a first color of imaging medium onto a first side of a print media, wherein the first set of print bar assemblies, when stationary, are configured to collectively span a width of the print media and wherein each of the print bar assemblies of the first set transfers the first color of imaging medium;
a second set of print bar assemblies configured to transfer a second percentage of the first color of imaging medium onto the first side of the print media, wherein the second set of print bar assemblies, when stationary, are configured to collectively span the width of the print media and wherein each of the print bar assemblies of the second set transfers the first color of imaging medium;
a third set of print bar assemblies configured to transfer a second color of imaging medium different than the first color onto the first side of the print media, wherein the third set of print bar assemblies, when stationary, are configured to collectively span the width of the print media, wherein the third set of print bar assemblies extends between the first set of print bar assemblies and the second set of print bar assemblies, and wherein each of the print bar assemblies of the third set transfer the second color of imaging medium; and
the print media being advanced such that the second percentage of the imaging medium is transferred onto the first side of the print media after the first percentage of the imaging medium is transferred onto the first side of the print media, wherein the first set of print bar assemblies comprises:
a plurality of print modules; and
a framework supporting and aligning the plurality of print modules such that the plurality of print modules are connected as a single assembly.

35. A printing system, comprising:
a first set of print bar assemblies configured to transfer a first percentage of an imaging medium onto a first side of a print media, wherein the first set of print bar assemblies, when stationary, are configured to collectively span a width of the print media;
a second set of print bar assemblies configured to transfer a second percentage of the imaging medium onto the first side of the print media; and
the print media being advanced such that the second percentage of the imaging medium is transferred onto the first side of the print media after the first percentage of the imaging medium is transferred onto the first side of the print media, wherein the imaging medium transferred by the first set of print bar assemblies is a chromatic color, wherein the imaging medium transferred by the second set of print bar assemblies is the same chromatic color and wherein the first print bar assembly and the second print bar assembly transfer substantially the same percentages of the imaging medium onto the print media, the percentages being substantially equally distributed amongst print bar assemblies sets and corresponding to a number of print bar assemblies sets in the printing system.

* * * * *

UNITED STATES PATENT AND TRADEMARK OFFICE
CERTIFICATE OF CORRECTION

| | |
|---|---|
| PATENT NO. | : 7,575,315 B2 |
| APPLICATION NO. | : 10/015911 |
| DATED | : August 18, 2009 |
| INVENTOR(S) | : Kenneth R. Williams et al. |

It is certified that error appears in the above-identified patent and that said Letters Patent is hereby corrected as shown below:

In column 11, line 31, in Claim 8, delete "system." and insert -- system --, therefor.

In column 12, line 39, in Claim 22, delete "Of" and insert -- of --, therefor.

Signed and Sealed this

Third Day of August, 2010

David J. Kappos
*Director of the United States Patent and Trademark Office*